Patented Apr. 26, 1938

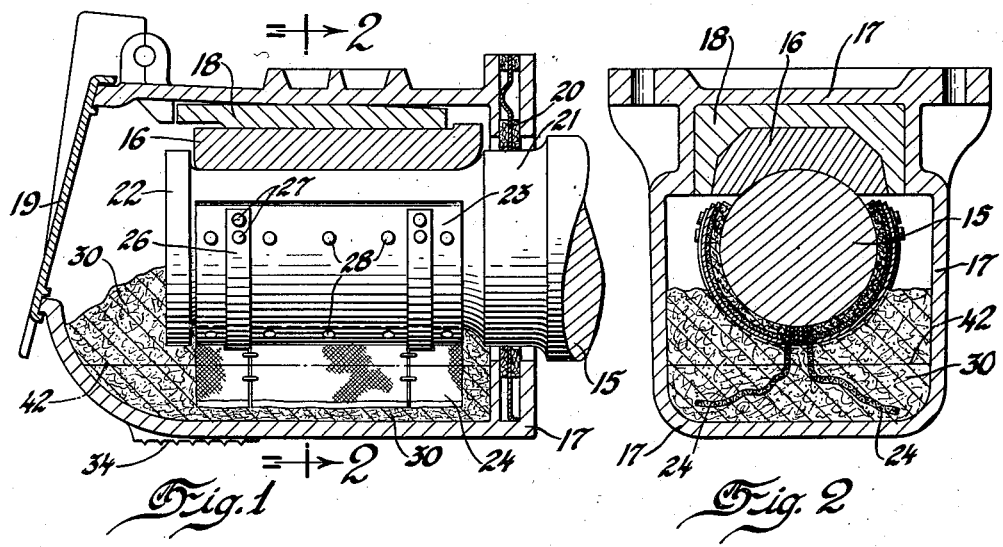
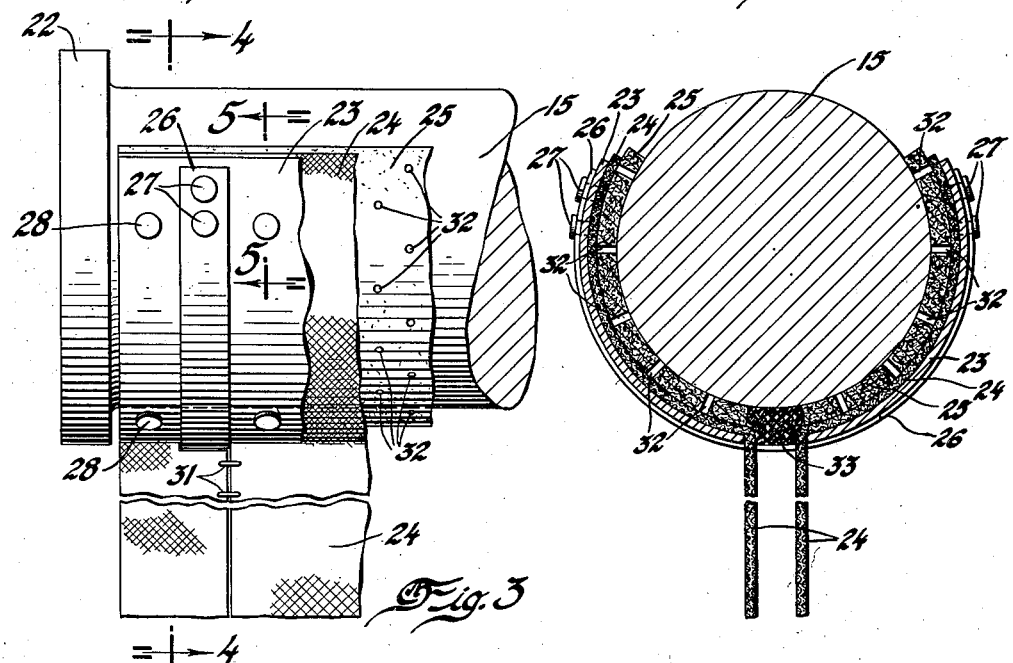
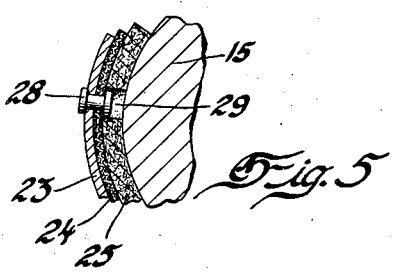

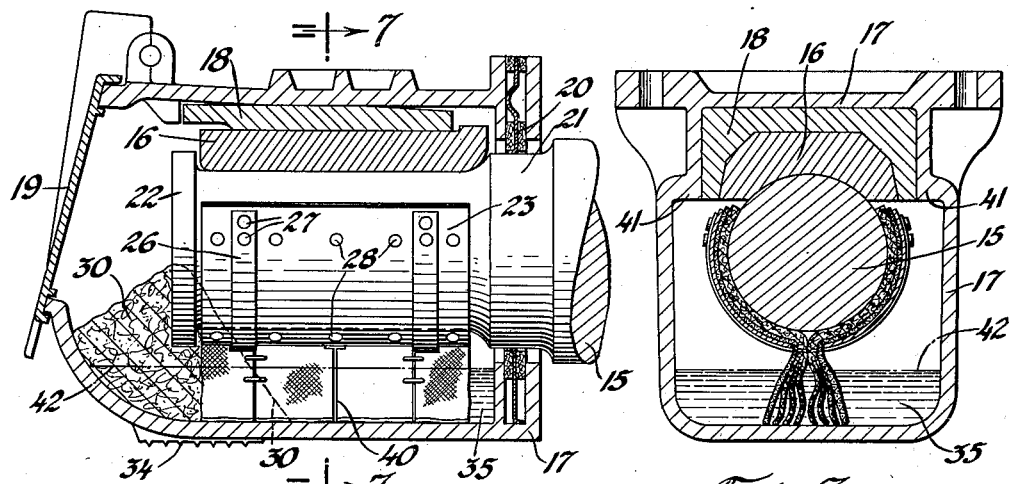

2,115,260

UNITED STATES PATENT OFFICE 2,115,260

CAR AXLE LUBRICATOR SLEEVE

Harry H. Grece, Detroit, Mich.

Application April 17, 1936, Serial No. 74,862

4 Claims. (Cl. 308—88)

This invention relates to railroad car axle lubricating means and in particular to sleeve type oiling means adapted to be supported from the car axle within the journal box.

The main object of this invention is to provide inexpensive yet positive means for adequately lubricating railroad car axles and keep them lubricated for long periods of time and thereby minimize the usual frequent replenishing and servicing of the lubricating means while the car is in service.

Another object of this invention is to provide railroad car axle lubricating means adapted to be sprung to and supported solely from a car axle.

Another object of this invention is to provide railroad car axle lubricating means adapted to be sprung around a car axle and applied to the said car axle through the opening ordinarily provided in a journal box through which oiled waste is customarily inserted and packed for lubricating the car axle.

Another object of this invention is to provide railroad car axle lubricating sleeves located within the journal box, sprung to the car axle, and having wicking thereof depending therefrom for drawing lubricant from the bottom of the journal box to the said lubricating means.

Another object of this invention is to provide railroad car axle lubricating sleeves located within the journal box, sprung to the car axle and having the lubricating pad and wicking thereof depending therefrom into a reservoir of lubricant at the bottom of the said journal box.

Another object of this invention is to provide railroad car axle lubricating means having the lubricating pad thereof in contact with the car axle and the wicking thereof spaced from the car axle, whereby the wicking does not become less effective during use.

Another object of this invention is to provide railroad car axle lubricating sleeves adapted to be sprung to a car axle, each sleeve having a lubricating pad in contact with the axle with wicking therearound and depending therefrom, the said lubricating pad having a plurality of apertures therethrough to permit free passage of lubricant from the wicking to the axle.

Another object of this invention is to provide car axle lubricating sleeves adapted to be sprung to a car axle in which the wicking thereof is held in spaced relation to the car axle by the lubricating pad thereof to provide positive lubrication by capillary attraction regardless of the wear on the lubricating pad.

Another object of this invention is to provide car axle lubricating sleeves adapted to be sprung to a car axle having means in connection therewith for relieving the pressure between the lubricating pad thereof and the car axle for minimizing the wear on the lubricating pad.

Another object of this invention is to provide car axle lubricating sleeves adapted to be sprung to a car axle in such a manner as to provide wear resisting contact between the springing means and the car axle to relieve the pressure between the lubricating pad thereof and the car axle created by the springing means, and thereby minimize the wear on the lubricating pad.

Other objects of this invention will become apparent by reference to the following detailed description taken in connection with the accompanying drawings, in which:

Fig. 1 is a longitudinal sectional view of a car axle lubricating sleeve assembly embodying the invention sprung to a car axle within a journal box.

Fig. 2 is a cross sectional view taken on the line 2—2 of Fig. 1.

Fig. 3 is an enlarged fragmentary view in elevation showing the lubricating sleeve assembly sprung to a car axle, portions thereof being broken away to better illustrate the invention.

Fig. 4 is an enlarged cross sectional view taken on the line 4—4 of Fig. 3 looking in the direction indicated by the arrows.

Fig. 5 is a fragmentary view showing the wicking secured to the outer metal sleeve of the lubricating sleeve assembly.

Fig. 6 is a longitudinal sectional view of another embodiment of a car axle lubricating sleeve assembly in which the lubricating sleeves are sprung to a car axle within a journal box.

Fig. 7 is a cross sectional view taken on the line 7—7 of Fig. 6.

Fig. 8 is an enlarged fragmentary view in elevation showing the embodiment of the lubricating sleeve assembly disclosed in Fig. 6 sprung to a car axle, portions thereof being broken away to better illustrate the invention.

Fig. 9 is an enlarged cross sectional view taken on the line 9—9 of Fig. 8 looking in the direction indicated by the arrows.

Fig. 10 is a fragmentary sectional view showing one type of wear resisting contact between the sleeve springing means and the car axle as may be applied to either of the embodiments of the invention.

Fig. 11 is a fragmentary view in perspective showing a wear resisting contact secured to the outer metal sleeve of a lubricating sleeve assembly with the wicking and lubricating pad removed.

Referring particularly to the drawings wherein like numerals refer to like and corresponding parts throughout the several views, both embodiments of the invention disclosed are illustrated in the drawings as applied to a railroad car axle 15 which may have a car or the like journaled thereon by means of a bearing 16 suitably secured in the top of the usual journal box 17 by a suitable wedge 18. The journal box 17 is provided with a spring closed hinged lid 19 which covers its front opening. A dust guard 20 around the hub seat 21 of the axle 15 seals the rear opening of the journal box 17. The end of the axle 15 is provided with a collar 22.

The embodiment of the lubricating sleeve assembly shown in Figs. 1 to 5 inclusive comprises, in general, a pair of arcuate metal sleeves 23 carrying wicking 24 and a lubricating pad 25 in the concaved portion thereof, the said arcuate metal sleeves 23 being secured in opposed relationship to each other to and within substantially circular band springs 26 near the open ends thereof by means of the rivets 26. The radius of the various parts of the said lubricating sleeve assembly is such as will permit the circular band springs 26 to urge the surface of the lubricating pads 25 into substantially even contact with the wearing surface of the car axle 15. The said substantially circular band springs 26 are of sufficient strength to support the lubricating sleeve assembly from the car axle 15 after being sprung thereto.

The lubricating pad 25 is preferably sewed to the wicking 24 which may be secured to the concaved side of the arcuate metal sleeve 23 by such means as the rivets 28 countersunk with respect to the lubricating pad 25 through apertures 29 provided therein. The wicking sheet 24 is long enough to depend from the lubricating sleeve assembly into the bottom of the journal box 17 which is preferably filled with an oil or other lubricant saturated waste 30, see Fig. 1 and Fig. 2.

The wicking 24 depending from the arcuate metal sleeve 23 is preferably split and notched as best shown in Fig. 3 to admit of assembly around the band springs 26, and, after assembly, the split wicking may be sewed together or clipped together by such means as the metal staples 31.

The lubricating pad 25 may be provided with a plurality of apertures 32 therethrough suitably spaced in staggered relationship to each other at comparatively frequent intervals through which lubricant from the wick 24 may flow freely to the car axle 15 where it is spread by the wiping action of the lubricating pad 25 over the wearing surface of the car axle 15 when the said car axle 15 turns within the lubricating sleeve assembly. The said apertures 32 also serve as temporary reservoirs into which any excess lubricant is retained when not demanded by the car axle, as, for example, when the car slows down or stops after an extended run.

A suitable longitudinally disposed wicking bat 33 may be placed between the lubricating pads 25 and wicking 24 at the space between the arcuate sleeves 23 at the bottom of the lubricating sleeve assembly to prevent lubricant once lifted to the axle 15 by capillary attraction through the wicking 24 from dropping therefrom.

The lubricating sleeve assembly is best inserted in the journal box 17 through its front opening normally closed by the spring hinged lid 19 after the car is jacked up from the axle 15 by jacking under the jack plate 34 provided on the bottom of the journal box 17. When the car is jacked up, ample clearance is provided in the top of the journal box 17 above the axle 15 to remove and replace the bearing 16 and the bearing wedge 18. When the bearing 16 and bearing wedge 18 are removed, the lubricating sleeve assembly may be sprung over the wearing surface of the axle 15, rotated 180 degrees in respect to the said axle 15 and thereby suspended therefrom.

The embodiment of the lubricating sleeve assembly shown in Figs. 6 to 9 inclusive comprises, in general, a pair of arcuate metal sleeves 23 carrying a wicking 24 and a lubricating pad 25 in the concaved portion thereof, the said arcuate metal sleeves 23 being secured in opposed relationship to each other to and within substantially circular band springs 26 near the open ends thereof by means of the rivets 27. The radius of the various parts of the lubricating sleeve assembly is such as will permit the circular band springs 26 to urge the concaved surface of the lubricating pads 25 into substantially even contact with the wearing surface of the car axle 15. The said substantially circular band springs 26 are of sufficient strength to support the lubricating sleeve assembly from the car axle 15 after being sprung thereto. The length of the lubricating sleeve assembly is sufficient to lubricate the entire wearing surface of the car axle 15.

The lubricating pad 25 is preferably secured to the concaved side of the arcuate metal sleeve 23 by such means as the rivets 28 countersunk with respect to the lubricating pad 25 through apertures 29 provided therein, see Fig. 5. The wicking sheet 24 and the lubricating pad 25 are both long enough to depend from the lubricating sleeve assembly into contact, or substantially into contact, with the bottom of the journal box 17 which is preferably filled with a suitable lubricant 35 as best illustrated in Fig. 7. The depending portion of the lubricating pad 25 is preferably split or parted into a plurality of strips 36 to increase the capillary ability of the said depending portion of the lubricating pad 25.

As best illustrated in Fig. 6, the front end of the journal box 17 is preferably dammed with lubricant saturated waste 30 or the like to prevent the lubricant 35 from spilling or overflowing through the front opening of the said journal box 17 at the joint between the said journal box 17 and its spring hinged lid 19 due to swaying motion of the car when in use or due to centrifugal force created when the car travels around curves. The depending portion of the wicking 24 and the lubricating pad 25 substantially divides the lubricant 35 into two separate pools and serves to prevent the lubricant from rising above the dam formed by the waste 30 during the starting, stopping and shifting of cars under ordinary operating conditions.

The wicking 24 and the lubricating pad 25 depending from the arcuate metal sleeve 23 are split and notched as best shown in Fig. 8 to admit of assembly around the band springs 26, and, after assembly, the split wicking may be sewed together or clipped together by such means as the metal staples 31.

The lubricating pad 25 may be provided with a plurality of apertures 32 therethrough suitably spaced in staggered relationship to each other at comparatively frequent intervals through which lubricant from the wick 24 may flow freely to the car axle 15 where it is spread by the wiping action of the lubricating pad 25 over the wearing surface of the car axle 15 when the said car axle 15 turns within the lubricating sleeve assembly. The said apertures 32 also serve as temporary reservoirs into which any excess lubricant is retained when not demanded by the car axle, as, for example, when the car slows down or stops after an extended run.

Referring now particularly to Figs. 8 and 9, suitably spaced preferably frustro-conical shaped pressure relieving contactors 37 of babbit or other wear resisting material harmless to the wearing surface of the car axle 15 may be inserted in apertures provided through the wicking 24 and the lubricating pad 25 therefor prior to riveting the said wicking 24 to the concaved surface of the arcuate metal sleeve 23. The said pressure relieving contactors 37 relieve the frictional wear on the surface of the lubricating pad 25 in contact with the axle 15 rotating therein by relieving the pressure between the lubricating pad 25 and the surface of the car axle 15 due to the clamping action of the substantially circular band springs 26 when the lubricating sleeve assembly is sprung to and supported from the car axle 15 thereby. Any number and spacing of pressure relieving contactors 37 may be used, the characteristics of the material of which they are made, the wear resisting qualities of the lubricating pad 25 and the strength of the band springs being determining factors.

Figs. 10 and 11 disclose another of the various types of pressure relieving means contemplated by this invention. The upper concaved portion of the arcuate metal sleeve 23 is provided with a plurality of pressure relieving contactors 38, at least two, preferably spaced along the upper edge thereof in such a manner as to take the pressure of the clamping action of the substantially circular band springs 26 when the lubricating sleeve assembly is sprung to and supported from the car axle 15 thereby, thus relieving the pressure between the lubricating pad 25 and the car axle 15 created by the circular band springs 26. The pressure relieving contactors 38 may be formed any desired shape other than the preferred frustro-pyramidal contactor shown in Fig. 11. The said contactors 38 may be secured to the arcuate metal sleeve 23 by such suitable means as riveting as indicated in Fig. 10. The said pressure relieving contactors 38 having a rivet 39 formed integral therewith are preferably of babbit or some other wear resisting material harmless to the wearing surface of the car axle 15.

It is contemplated that either the contactors 37 or the contactors 38 or a combination of both types of contactors may be used with both embodiments of the lubricating sleeve assembly disclosed herein and with other lubricating means broadly included within the scope thereof.

The lubricating sleeve assembly shown in Figs. 6 to 9 inclusive is best inserted in the journal box 17 in the manner hereinbefore described for the insertion of the embodiment of the invention shown in Figs. 1 to 5 inclusive. However, owing to the thickness of the depending wicking 24 and lubricating pads 25, it may be advisable to split and notch the same as indicated by the lines 40 of Fig. 6 to permit the depending wicking and lubricating pads to be easily flexed around the usual central protuberances 41 in the upper portion of the journal box 17.

The lubricating sleeve assembly shown in Figs. 6 to 9 inclusive will function, of course, with the journal box packed with lubricant saturated waste instead of free lubricant as indicated in Figs. 6 and 7.

Whenever lubricant saturated waste is used with the lubricating sleeve assemblies disclosed herein it is contemplated and preferable that free lubricant will be added to the waste to bring the lubricant level in the journal box 17 up to the dot and dash line 42 in Figs. 1, 2, 6 and 7 of the drawings.

The operation of the invention is obvious from the description, the lubricating means disclosed herein providing positive long wearing qualities not heretofore found in the art. Also, inasmuch as the lubricating means herein disclosed is wholly supported from the car axle, the various sizes and shapes of journal boxes now in use do not limit the practical application of the invention to rolling stock now in use by the various railroads.

Although but two specific embodiments of this invention have been disclosed and described herein, it will be understood that various changes including the size, shape, arrangement and details of the various parts thereof may be made without departing from the spirit of the invention, and it is not intended to limit the scope of the invention other than by the terms of the appended claims.

I claim:

1. In combination with a car axle and a journal box, a pair of arcuately formed lubricating sleeves including lubricating means secured in the concaved portion thereof located within said journal box, spring means for securing said lubricating sleeves to and solely supporting the same from said car axle, and wear resisting means on said lubriating sleeves positioned through said lubricating means for relieving the spring pressure between said lubricating sleeves and the car axle, the said lubricating means depending from said lubricating sleeves into a reservoir of lubricant in the bottom of said journal box.

2. In combination with a car axle and a journal box, a pair of arcuately formed lubricating sleeves, each lubricating sleeve comprising an arcuate metal sleeve having a layer of wicking and a layer of lubricating padding secured in the concaved portion thereof, a plurality of apertures through said lubricating padding serving as lubricant reservoirs and through which lubricant passes from the said wicking directly to the car axle, and means for springing said lubricating sleeves around said axle, the said wicking depending from said lubricating sleeves into the bottom of said journal box.

3. In combination with a car axle and a journal box, a pair of lubricating sleeves, each lubricating sleeve comprising an arcuate metal sleeve having a layer of wicking and a layer of lubricating padding secured in the concaved portion thereof, a plurality of apertures through said lubricating padding serving as lubricant reservoirs and through which lubricant passes from the wicking to the car axle, means for springing said lubricating sleeves around said axle, and wear resisting means for relieving the spring pressure between the said padding and the car axle, the said wicking depending from said lubricating sleeves into the bottom of said journal box.

4. In combination with a car axle and a journal box, a pair of arcuately formed lubricating sleeves including lubricating means secured in the concave portion thereof located within said journal box, spring means for securing said lubricating sleeves to and solely supporting the same from said car axle above the center line thereof, and wear resisting pressure relieving contactors on said lubricating sleeves positioned through said lubricating means adapted to grip said car axle above the horizontal center thereof under pressure applied by said spring means, the said pressure relieving contactors being substantially the same thickness as said lubricating means whereby to relieve spring pressure between said lubricating sleeve and said car axle, the said lubricating means depending from said lubricating sleeve into the bottom of said journal box.

HARRY H. GRECE.